(12) United States Patent
Hirota (10) Patent No.: US 7,118,088 B2
(45) Date of Patent: Oct. 10, 2006

(54) FLUID CONTROL VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 51 days.

(21) Appl. No.: 11/103,534

(22) Filed: Apr. 12, 2005

(65) Prior Publication Data

US 2005/0224740 A1 Oct. 13, 2005

(30) Foreign Application Priority Data

Apr. 13, 2004 (JP) ............................. 2004-117644

(51) Int. Cl.
*F16K 31/02* (2006.01)

(52) U.S. Cl. ............ 251/129.19; 251/205; 251/129.18; 251/282; 137/506

(58) Field of Classification Search ............ 251/129.19
See application file for complete search history.

(56) References Cited

U.S. PATENT DOCUMENTS

| | | | | |
|---|---|---|---|---|
| 3,498,331 A | * | 3/1970 | Grune | 137/625.66 |
| 4,074,700 A | * | 2/1978 | Engle | 137/625.27 |
| 4,202,526 A | * | 5/1980 | Muller et al. | 251/51 |
| 4,314,585 A | * | 2/1982 | Nishimiya et al. | 137/625.34 |
| 4,338,966 A | * | 7/1982 | Smith | 137/596.17 |
| 4,895,126 A | * | 1/1990 | Nishimiya et al. | 123/585 |
| 5,443,241 A | * | 8/1995 | Odaira et al. | 251/129.07 |
| 5,765,513 A | * | 6/1998 | Diehl et al. | 123/90.11 |
| 6,394,415 B1 | * | 5/2002 | Ohmi et al. | 251/129.16 |
| 6,702,252 B1 | * | 3/2004 | Ben-Asher et al. | 251/129.19 |
| 6,712,333 B1 | * | 3/2004 | Rovira et al. | 251/129.19 |
| 2002/0074532 A1 | * | 6/2002 | Rovira et al. | 251/129.21 |
| 2002/0125451 A1 | * | 9/2002 | Ben-Asher et al. | 251/129.19 |

OTHER PUBLICATIONS

Patent Abstracts of Japan, Publication No. 2002-372164, published on Dec. 26, 2002.

\* cited by examiner

*Primary Examiner*—J. Casimer Jacyna
(74) *Attorney, Agent, or Firm*—Westerman, Hattori, Daniels & Adrian, LLP.

(57) ABSTRACT

To provide a fluid control valve which is capable of preventing or suppressing degradation of the accuracy of flow rate control dependent on the lift amount of a valve element from a valve seat. An expansion valve is configured such that a valve portion and a valve portion integrally formed with a valve element move to and away from a valve seat and a valve seat, respectively, simultaneously. Further, the expansion valve is configured such that a flow passage cross-section formed by a gap between the valve portion and the valve seat, and a flow passage cross-section formed by a gap between the valve portion and the valve seat have approximately the same size when the expansion valve is open. As a result, it is possible to almost cancel the influence of changes in effective pressure-receiving areas acting on the respective valve elements when the expansion valve is open, on the pressure balance, thereby making it possible to prevent degradation of the accuracy of flow rate control dependent on the lift amount of the valve elements.

10 Claims, 10 Drawing Sheets

FLUID CONTROL VALVE

CROSS-REFERENCES TO RELATED APPLICATIONS, IF ANY

This application claims priority of Japanese Application No. 2004-117644 filed on Apr. 13, 2005 and entitled "FLUID CONTROL VALVE".

BACKGROUND OF THE INVENTION (1) Field of the Invention

The present invention relates to a fluid control valve that adjusts a flow rate of fluid introduced from an upstream side thereof to allow the fluid to be delivered downstream.

(2) Description of the Related Art

Conventionally, a solenoid valve is known which is disposed in a flow passage of fluid for adjusting a flow rate of fluid introduced from an upstream side thereof to allow the fluid to be delivered downstream (see e.g. Japanese Unexamined Patent Publication (Kokai) No. 2002-372164).

Generally, the solenoid valve of this type comprises a solenoid that actuates a valve element for opening and closing operations, and a valve mechanism that opens and closes a flow passage using the valve element. The solenoid includes a solenoid coil to which control current is externally supplied, a core that is fixed, as a fixed core, to the solenoid coil along the axis thereof, a plunger that is axially movably disposed, as a movable core, along the axis of the solenoid coil for operating in unison with the valve element, and a spring that urges the plunger in the valve-opening direction or in the valve-closing direction when the solenoid coil is deenergized. Further, the valve mechanism includes two ports formed in the body, a valve seat that is disposed in a flow passage connecting between the ports and integrally formed with the body, and a valve element that is disposed in a manner opposed to the valve seat and actuated together with the plunger for opening and closing operations.

The solenoid valve has energization of the solenoid controlled to control the lift amount of the valve element from the valve seat to thereby adjust the flow rate of fluid allowed to be delivered downstream.

By the way, the valve element of such a solenoid valve is controlled to move to a position where pressure received from fluid (fluid pressure), an urging force of a spring, and an electromagnetic force generated by the solenoid are balanced. However, as the lift amount of the valve element from the valve seat is increased, there occurs a phenomenon in which an area at which the valve element actually receives pressure (effective pressure-receiving area) decreases, which changes the lift of the valve element and the balance of pressure, resulting in the degraded accuracy of flow rate control of the fluid.

It is considered that the above problems occur not only in the solenoid valve which electromagnetically actuates the valve element but also in a fluid control valve which adjusts the lift amount of the valve element using only the balance between mechanical mechanisms, such as a spring, and the fluid pressure.

SUMMARY OF THE INVENTION

The present invention has been made in view of these points, and an object thereof is to provide a fluid control valve which is capable of preventing or suppressing degradation of the accuracy of flow rate control dependent on the lift amount of a valve element from a valve seat.

To solve the above problem, the present invention provides a fluid control valve that adjusts a flow rate of fluid introduced from an upstream side thereof to allow the fluid to be delivered downstream, comprising a body having a flow passage of the fluid formed therein, a first valve seat and a second valve seat arranged in the body along the flow passage, a valve element having a first valve portion and a second valve portion which are formed integrally therewith, the first valve portion and the second valve portion being capable of moving to and away from the respective first valve seat and second valve seat, approximately simultaneously, the valve element moving forward and backward within the body while being supported therein, to thereby adjust a flow rate of the fluid allowed to be delivered downstream according to a lift amount of each valve portion from the valve seat associated therewith, and a pressure-canceling structure including a valve-opening pressure-receiving surface for receiving a pressure of the fluid acting on the valve element in a valve-opening direction, and a valve-closing pressure-receiving surface for receiving a pressure of the fluid acting on the valve element in a valve-closing direction, the pressure-canceling structure canceling at least part of the pressure of the fluid acting on the valve element.

The above and other objects, features and advantages of the present invention will become apparent from the following description when taken in conjunction with the accompanying drawings which illustrate preferred embodiments of the present invention by way of example.

DESCRIPTION OF THE PREFERRED-EMBODIMENTS

Hereinafter, embodiments of the present invention will be described in detail with reference to the drawings.

[First Embodiment]

Figure 1:
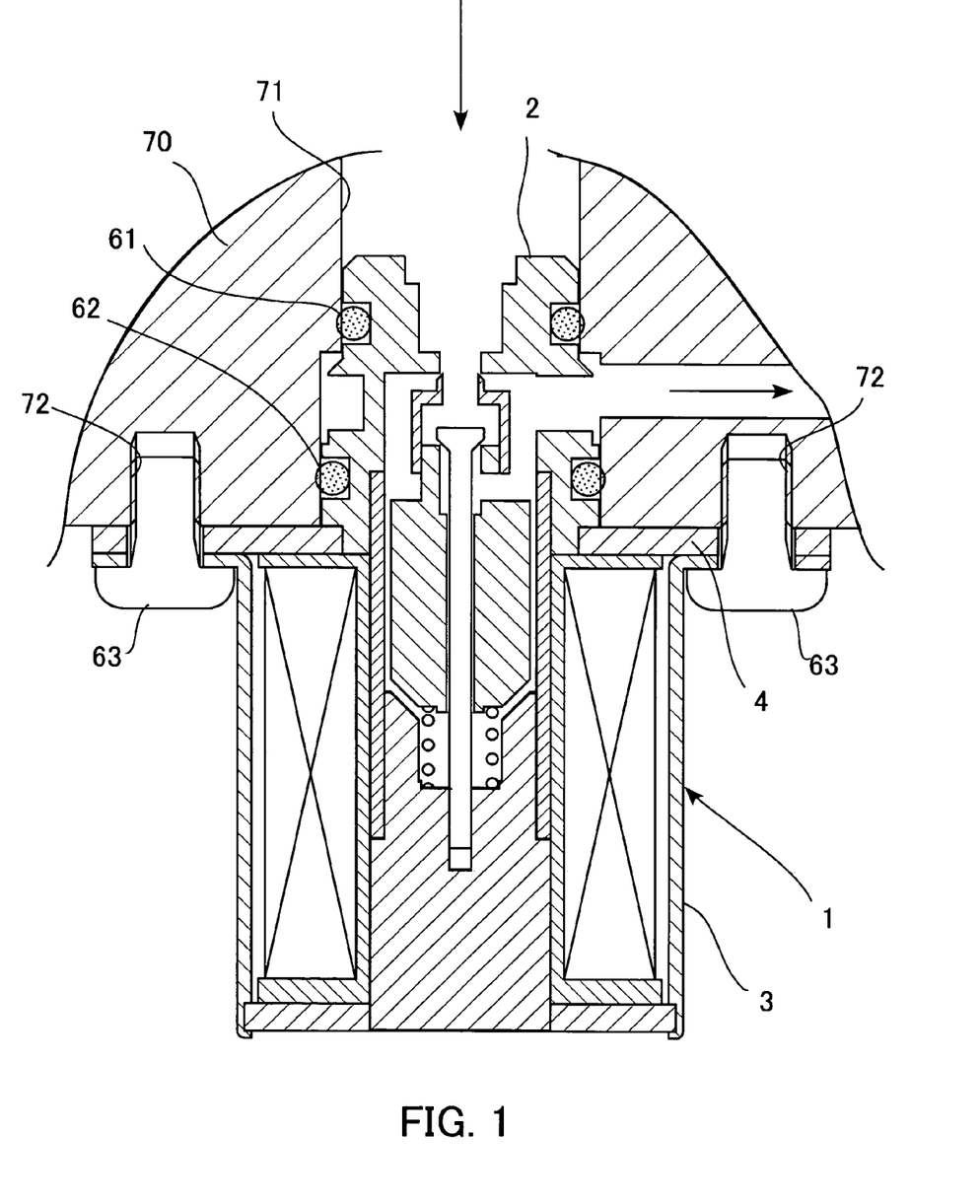
FIG. 1 is a cross-sectional view showing an expansion valve according to a first embodiment of the present invention disposed in a piping body of a refrigeration cycle.
Figure 2:
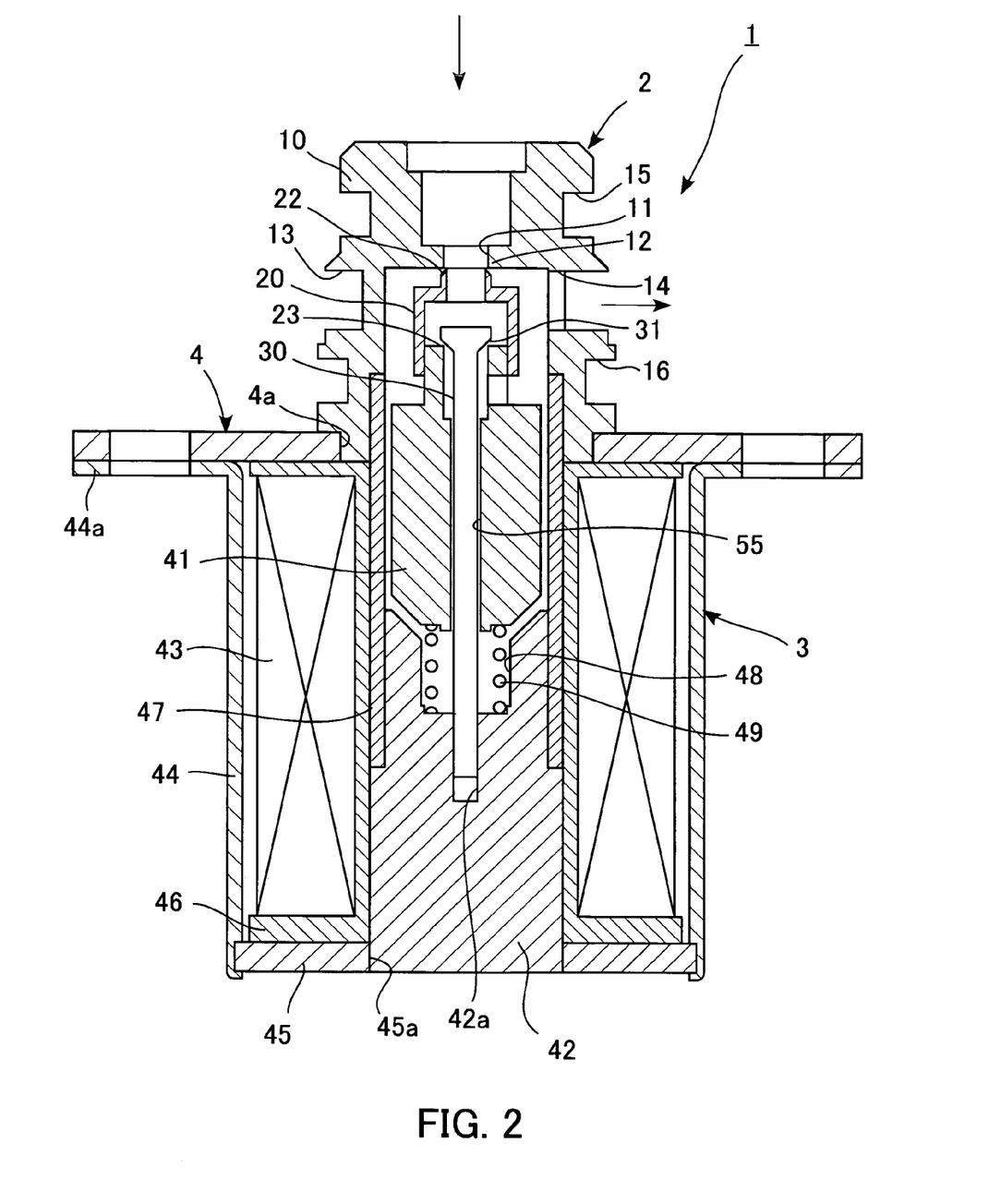
FIG. 2 is a cross-sectional view showing the configuration of a single unit of the expansion valve.
Figure 3:
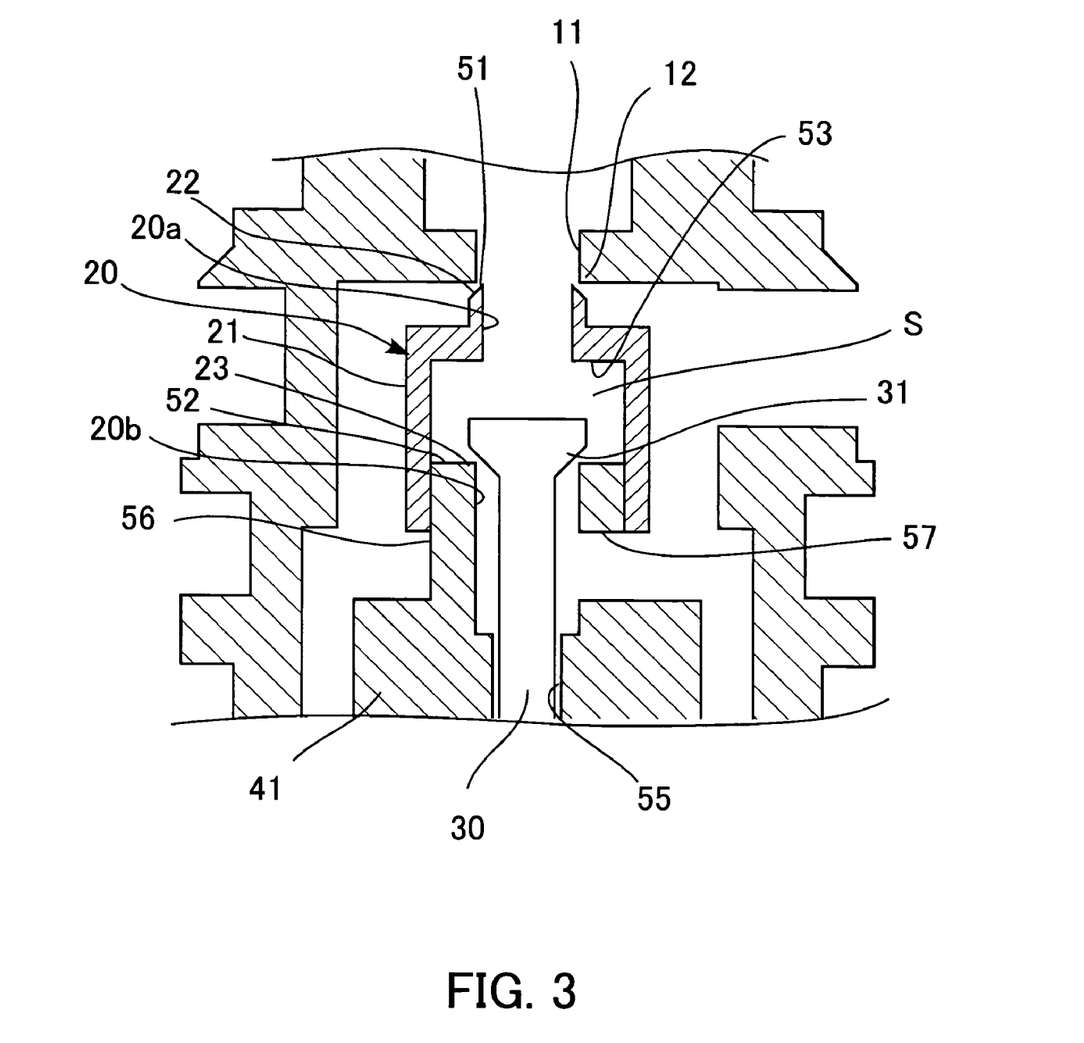
FIG. 3 is an enlarged view showing a valve element of the expansion valve and its the vicinity appearing in FIG. 2.

First, a first embodiment of the present invention will be described. In the present embodiment, a fluid control valve according to the present invention is configured as an expansion valve disposed in a refrigeration cycle for an automotive air conditioner. FIG. 1 is a cross-sectional view showing the expansion valve according to the present embodiment disposed in a piping body of the refrigeration cycle, and FIG. 2 is a cross-sectional view showing the configuration of a single unit of the expansion valve. FIG. 3 is an enlarged view showing a valve element of the expansion valve and its vicinity appearing in FIG. 2. It should be noted that in the following description, the terms "upstream" and "downstream" are sometimes used with reference to the direction of flow of refrigerant (fluid) in the refrigeration cycle. Further, for convenience of description, the terms "upper" and "lower" are sometimes used for description as viewed in the figures.

As shown in FIG. 1, the expansion valve 1 comprises a valve main body 2 that is assembled with the inside of the piping body 70 and disposed in a refrigerant passage 71 of the piping body 70, and a solenoid 3 that is disposed in a manner continuous with the valve main body 2 and exposed to the outside of the piping body 70. Interposed between the valve main body 2 and the solenoid 3 is a flanged plate 4 that extends outward, and the expansion valve 1 is fixed to the piping body 70 via the plate 4.

Referring to FIG. 2, the valve main body 2 comprises a hollow cylindrical body 10 having a refrigerant passage formed therethrough, a hollow cylindrical valve element 20 that is moved upward and downward within the body 10, and a long shaft-like member 30 forming a valve mechanism together with the valve element 20.

The body 10 has an upstream portion thereof formed with a valve hole 11 defined by a stepped portion thereof which protrudes radially inward, and a valve seat 12 (first valve seat) is formed by a peripheral edge of an open end of the valve hole 11. Further, the body 10 has a passage groove 13 circumferentially formed in an outer periphery thereof downstream of the valve seat 12, which provides a refrigerant passage. The passage groove 13 is formed with a plurality of communication holes 14 in a circumferential arrangement, which extend radially therethrough for communication between the inside of the body 10 and the downstream side of a refrigerant passage 71. The body 10 has fitting grooves 15 and 16 circumferentially formed in the outer periphery thereof on opposite sides of the communication holes 14, for having O rings 61 and 62 (see FIG. 1) fitted therein, respectively, for maintaining airtightness. The body 10 has a lower end thereof press-fitted in a hole 4a formed in the center of the plate 4.

Referring to FIG. 3, the valve element 20 has a hollow cylindrical body 21 fixed to the foremost end of a plunger 41, referred to hereinafter, of the solenoid 3, and an end of the valve element 20 toward the valve seat 12 is constricted to form an introduction passage 20a for introducing refrigerant, the inner diameter of which is slightly smaller than that of the valve hole 11. The foremost end of the constricted portion is formed with a valve portion 22 (first valve portion) which is formed to have a tapered shape sloped inward toward the foremost end such that it can be removably seated on the valve seat 12. When the valve portion 22 is seated on the valve seat 12, the foremost end of the valve portion 22 is inserted into the valve hole 11 by a predetermined amount. An end of the body 21, opposite from the valve portion 22, forms part of the valve element 20 and at the same time has the foremost end of the plunger 41 which is formed with a refrigerant passage, inserted therein, to define a delivery passage 20b for delivering refrigerant. A valve portion 23 (second valve portion) is defined by an inner peripheral edge of the foremost end of the plunger 41.

Further, an end of the shaft-like member 30 is received in a space S (expanded-pipe portion) formed between the introduction passage 20a and the delivery passage 20b. The end of the shaft-like member 30 has a tapered shape the outer diameter of which is expanded toward the foremost end thereof, and this tapered portion forms a valve seat 31 (second valve seat) on which the valve portion 23 can be removably seated. The valve seat 31 is set to a location in such a relation to the valve element 20 as enables the two valve portions 22 and 23 to be seated on the respective valve seats 12 and 31, simultaneously.

The valve element 20 is formed with a pressure-canceling structure. More specifically, a valve-opening pressure-receiving surface that receives pressure of high-pressure refrigerant introduced into the space S of the valve element 20 from the upstream side is formed by a portion 51 inserted into the valve hole 11 in an upstream end face of the valve portion 22, and a portion 52 facing the space S in the vicinity of the valve portion 23, while a valve-closing pressure-receiving surface that receives the pressure of the high-pressure refrigerant is formed by a downstream facing surface 53 forming a boundary between the introduction passage 20a and the space S. This makes it possible to cancel part of the pressure of the high-pressure refrigerant applied to the valve element 20, whereby the expansion valve 1 is capable of handling a large differential pressure thereacross.

Referring again to FIG. 2, the solenoid 3 includes the plunger 41 and a core 42 arranged along an axial direction in which the valve element 20 of the valve main body 2 is opened and closed, a solenoid coil 43 that generates a magnetic circuit including the plunger 41 and the core 42 by electric current externally supplied thereto, and a yoke 44 disposed in a manner covering the solenoid coil 43 to form a casing of the solenoid 3.

The yoke 44 has a hollow cylindrical body which has a flanged portion 44a radially outwardly extending from one end thereof, and the yoke 44 is welded to the plate 4 at the flanged portion 44a. On the other hand, disposed at the other end of the body of the yoke 44 is a plate 45 in the form of a disk made of a metal, which is rigidly fixed to the body by caulking the other end of the body. The solenoid coil 43 is wound around a hollow cylindrical bobbin 46, and a core 42 is disposed in a lower half of the bobbin 46. The core 42 has a lower end thereof press-fitted in a fitting hole 45a formed in the center of the plate 45.

Further, inside the bobbin 46 is mounted a sleeve 47 made of a non-magnetic material, which extends from a lower end of the body 10 to an upper end of the core 42. More specifically, the sleeve 47 has one end thereof inserted into an expanded pipe portion of the lower end of the body 10, which is slightly increased in inner diameter, and the other end thereof fitted on a reduced-diameter portion of the upper end of the core 42, which is slightly reduced in diameter, and is disposed such that it covers a range of motion of the plunger 41.

The core 42 has a cylindrical body which has a circular accommodating groove 48 formed in the center of an upper end thereof to a predetermined depth. In the accommodating groove 48 is accommodated a compression coil spring 49 which is interposed between the plunger 41 and the core 42 for urging the plunger 41 in a direction away from the core 42. The core 42 has an upper end thereof formed to have a tapered shape upwardly outwardly sloped from a peripheral edge of an opening of the accommodating groove 48.

On the other hand, the plunger 41 has a cylindrical body which has an outer diameter slightly smaller than the inner diameter of the sleeve 47, and an insertion hole 55 axially extending through the center of the body. The above described shaft-like member 30 is inserted into the insertion hole 55 with a predetermined clearance. The shaft-like member 30 has a lower end thereof inserted into a fitting groove 42a formed along an axis of the core 42, and fixed thereto.

As shown in FIG. 3, a valve element-forming portion 56 having a hollow cylindrical shape and communicating with the insertion hole 55 extends upward from the center of an upper end of the plunger 41, and the valve portion 23 described above is formed by the peripheral edge of a foremost end-side opening of the valve element-forming portion 56. The valve element-forming portion 56 has an inner diameter larger than that of the insertion hole 55, and a side wall thereof is formed with a communication hole 57 communicating with the downstream side of the refrigerant passage 71. Therefore, refrigerant having passed through a gap between the valve portion 23 and the valve seat 31 flows through the refrigerant passage formed inside the valve element-forming portion 56 to be delivered downstream.

Referring again to FIG. 2, an end of the plunger 41, opposite from the valve element-forming portion 56, is formed to have a tapered shape the outer diameter of which is reduced toward the foremost end thereof, and the tapered portion thereof has a complementary shape to the tapered portion of the core 42.

In the arrangement described above, a body of the whole expansion valve 1 is formed by the body 10 of the valve main body 2 and the yoke 44 of the solenoid 3. The magnetic circuit of the solenoid 3 surrounding the solenoid coil 43 is formed by the plunger 41, the core 42, the plate 45, the yoke 44, the plate 4, and so forth.

In this case, since the opposed surfaces of the plunger 41 and the core 42 are formed to have respective tapered shapes and be sloped, there occurs a phenomenon of so-called magnetic leakage, in which in a magnetic circuit, a component of the attracting force is generated in the radial direction perpendicular to the axial direction as the proper attracting direction. This reduces the attractive force generated when the plunger 41 and the core 42 are close to each other. Inversely, when the plunger 41 and the core 42 are distant from each other, even if they are away from each other by the same distance, the shortest distance therebetween in the axial direction is reduced, which makes it possible to practically reduce the magnetic gap. As a result, it is possible to enhance the attractive force acting between the plunger 41 and the core 42 when they are distant from each other.

It should be noted that the configuration in which the two valve portions 22 and 23 formed integrally with the valve element 20 are seated on the respective valve seats 12 and 31 simultaneously can be realized e.g. as follows: First, the shaft-like member 30 is inserted into the insertion hole 55 of the plunger 41 from the direction of the valve element-forming portion 56, and then the valve element 20 is fixed to the valve element-forming portion 56 of the plunger 41 by press-fitting. Subsequently, in this state, the plunger 41 is inserted into the sleeve 47. At this time, the foremost end of the shaft-like member 30 is positioned at the location of the fitting groove 42a of the core 42. Next, from this state, the body 10 is assembled to the solenoid 3 joined to the plate 4. At this time, the valve portion 22 is seated on the valve seat 12, and the valve seat 31 of the shaft-like member 30 is away from the valve portion 23. Then, the expansion valve 1 is connected to the piping body 70 for use in testing, and the shaft-like member 30 is fitted in the fitting groove 42a with a predetermined tool, while fluid is caused to flow such that the differential pressure across the expansion valve 1 is held at a certain fixed pressure. At this time, the flow rate of the fluid on the downstream side is measured, and when the flow rate has become approximately equal to zero (not larger than a predetermined value), it is regarded that the valve portion 23 has been seated on the valve seat 31, and the fitting of the shaft-like member 30 into the fitting groove 42a is stopped. Thus, the shaft-like member 30 is fixed to the location which enables the two valve portions 22 and 23 to be seated on the respective valve seats 12 and 31 simultaneously.

Further, in the present embodiment, the sizes and the shapes of the valve portions and the valve seats associated therewith are set and configured such that a flow passage cross-section formed by a gap between the valve portion 22 and the valve seat 12, and a flow passage cross-section formed by the gap between the valve portion 23 and the valve seat 31 have approximately the same size when the expansion valve 1 is open.

The expansion valve 1 configured as above is fixed to the piping body 70, as shown in FIG. 1. More specifically, in a state in which the expansion valve 1 is inserted into the refrigerant passage 71 with the valve main body 2 first, screws 63 are inserted into a plurality of insertion holes formed through the yoke 44 and the plate 4, and fastened to screw holes 72 formed in the piping body 70, whereby the expansion valve 1 is fixed to the piping body 70. At this time, the airtightness between the expansion valve 1 and the piping body 70 is preserved by the O rings 61 and 62 fitted on the outer periphery of the body 10. The expansion valve 1 does not include any casing or the like for accommodating the body 10, but the body 10 is directly fixed to the inside of the piping body 70.

Next, the operation of the expansion valve 1 will be described with reference to FIG. 1 and FIG. 2.

First, when electric current is not supplied to the solenoid coil 43, the plunger 41 is urged in the upstream direction by the compression coil spring 49, and no attractive force is generated between the plunger 41 and the core 42, so that the valve portions 22 and 23 are seated on the valve seats 12 and 31, respectively, and the expansion valve 1 is in a fully-closed state.

When the electric current i is supplied to the solenoid coil 43, an electromagnetic force with a magnitude dependent on the value of the electric current is generated to attract the plunger 41 toward the core 42. As a result, the valve portions 22 and 23 are simultaneously moved away from the valve seats 12 and 31, respectively, and stand still at a location where the electromagnetic force and the load of the compression coil spring 49 are balanced, thereby forming predetermined flow passage cross-sections between the respective valve portions and the valve seats associated therewith. In this state, when high-pressure refrigerant is introduced from the upstream side, the refrigerant undergoes adiabatic expansion by passing through the gaps between the respective valve portions and the valve seats associated therewith to be delivered downstream. At this time, part of the pressure of the refrigerant applied to the valve element 20 and further to the plunger 41 is canceled by the above-mentioned pressure-canceling structure.

Now, assuming that an inlet pressure of refrigerant which is introduced into the expansion valve 1 from the upstream side of the refrigerant passage 71 is represented by P1, an outlet pressure of refrigerant decompressed by passing through the gaps between the respective valve portions and the valve seats associated therewith by P2, the effective pressure-receiving area of the valve portion 22 seated on the valve seat 12 (i.e. the flow passage cross-sectional area of the valve hole 11) by A, the effective pressure-receiving area of the valve portion 23 seated on the valve seat 31 (i.e. the flow passage cross-sectional area of the valve element-forming portion 56) by B, the electromagnetic force generated by the current i by f(i), the spring force of the compression coil spring 49, in the upstream direction by fs, and the flow passage cross-sectional areas formed by the gaps between the respective valve portions and the valve seats associated therewith, when the electric current i is supplied, by s(i), the relationship between forces in the upward direction and forces in the downward direction is expressed by the following equation:

$$((A-s(i))-(B-s(i))\times(P1-P2)=fs-f(i) \quad (1)$$

and the differential pressure across the expansion valve (P1–P2) is expressed by the following equation:

$$P1-P2=(fs-f(i))/(A-B) \quad (2)$$

That is, the influence of the flow passage cross-sectional area s(i) which varies with the electric current i is eliminated. Further, in the right side of the equation (2), the parameters other than the electromagnetic force f(i) are substantially fixed values, and hence the differential pressure (P1–P2) across the expansion valve 1 becomes a constant differential pressure proportional to the electric current i supplied to the solenoid coil 43. In short, the expansion valve 1 is configured as a differential pressure valve.

At this time, when the flow rate of refrigerant on the upstream side of the refrigeration cycle increases to increase the inlet pressure P1, the valve portions 22 and 23 are moved in the valve-opening direction to increase the flow rate of refrigerant, which acts to hold the differential pressure (P1–P2) constant. Inversely, even when the flow rate of refrigerant on the upstream side of the refrigeration cycle decreases to decrease the inlet pressure P1, the valve portions 22 and 23 are moved in the valve-closing direction to restrict the flow rate of refrigerant, which acts to hold the differential pressure (P1–P2) constant. As a result, the differential pressure (P1–P2) across the expansion valve 1 is always held at a constant value dependent on the electric current i.

Further, if the expansion valve 1 is configured such that the effective pressure-receiving area A and the effective pressure-receiving area B become equal to each other, the left side of the equation (1) becomes equal to zero. That is, there is obtained the following equation:

$$fs=f(i) \quad (3)$$

Here, assuming that a set value (initial value) of the urging force of the compression coil spring 49 is represented by fs0, a spring constant by Ks, and the lift amount of each valve portion from the valve seat associated therewith by Δx, there is the relationship expressed by the following equation:

$$fs=fs0+Ks\cdot\Delta x \quad (4)$$

By taking this relationship into account, if the equation (4) is substituted into the equation (3), and rearranged with respect to Δx, the following equation is obtained:

$$\Delta x=(f(i)-fs0)/Ks \quad (5)$$

On the right side of this equation (5), the parameters other than the electromagnetic force f(i) are fixed values, and hence the valve lift becomes a constant value proportional to the electric current i supplied to the solenoid coil 43. That is, the expansion valve 1 is configured as a proportion valve.

As described hereinabove, in the expansion valve according to the present embodiment, the valve portions 22 and 23 formed integrally with the valve element 20 are configured to move to and away from the respective valve seats 12 and 31 approximately simultaneously. Further, when the expansion valve is open, the flow passage cross-section formed by the gap between the valve portion 22 and the valve seat 12, and the flow passage cross-section formed by the gap between the valve portion 23 and the valve seat 31 have approximately the same size. As a result, it is possible to cancel the influence of changes in the effective pressure-receiving areas acting on the respective valve portions when the expansion valve is open, on the pressure balance, thereby making it possible to prevent degradation of the accuracy of flow rate control dependent on the lift amounts of the valve portions.

Further, the expansion valve 1 of the present embodiment can provide the same advantageous effects, even if refrigerant flows in an opposite direction to the direction shown in FIG. 1 and FIG. 2. That is, the expansion valve 1 is capable of functioning as a bidirectional expansion valve.

[Second Embodiment]

Figure 4:
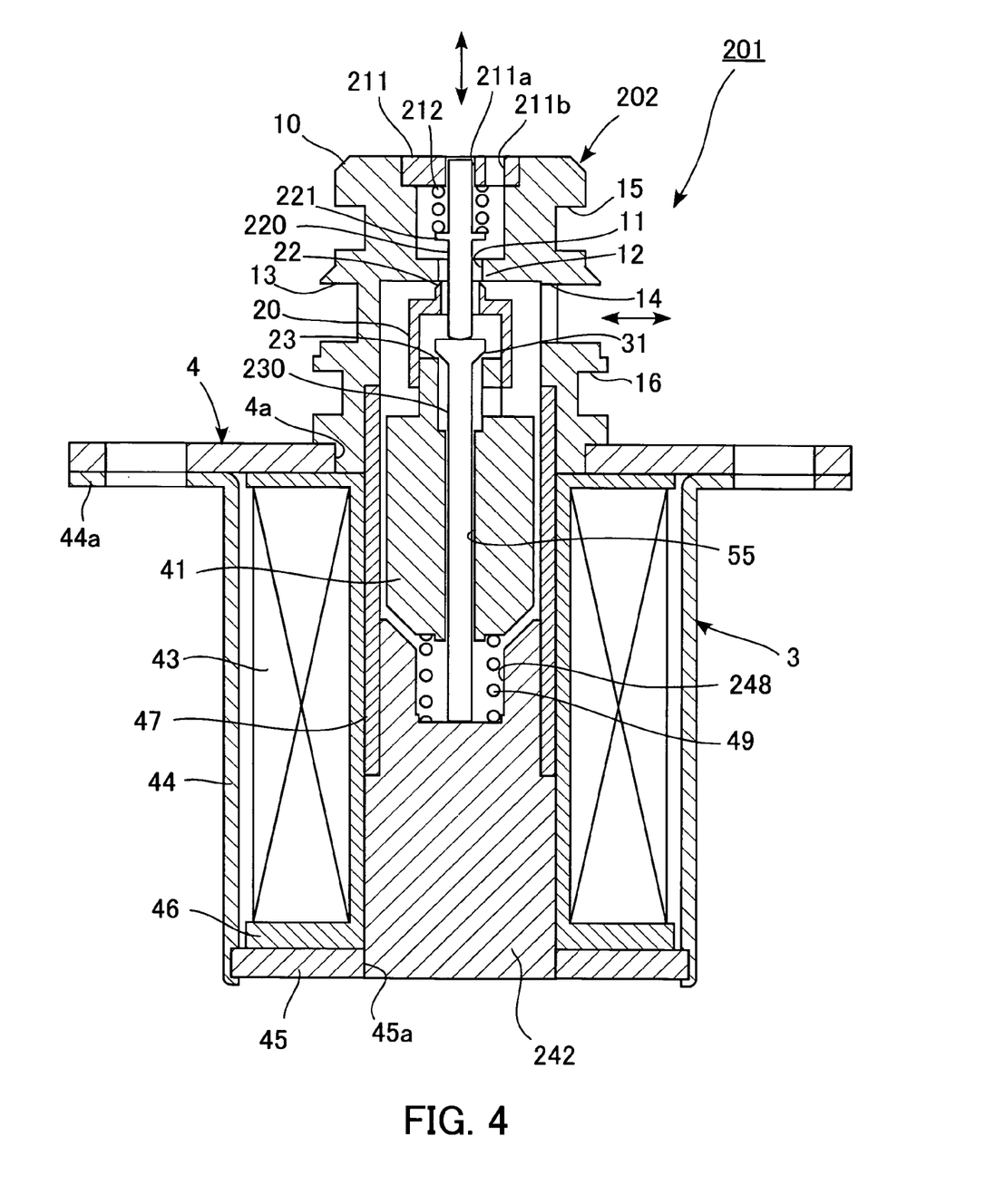
FIG. 4 is a cross-sectional view showing the configuration of an expansion valve according to a second embodiment of the present invention.

Next, a description will be given of a second embodiment of the present invention. FIG. 4 is a cross-sectional view showing the configuration of an expansion valve according to the present embodiment. It should be noted that component parts approximately identical to those of the first embodiment will be designated by identical reference numerals as required, and description thereof is omitted.

As shown in FIG. 4, in the expansion valve 201, the fitting groove 42a extending along the axial direction, as shown in FIG. 2, is not included in a accommodating groove 248 of a core 242. Further, a shaft-like member 230 has an end thereof opposite to the valve seat 31 brought into abutment with the accommodating groove 248 for engagement therewith such that the shaft-like member 230 is axially restricted in motion.

Further, a valve main body 202 includes a long urging member 220 for abutment with an end face of the shaft-like member 230 on a side toward the valve seat 31, and a stopper 211 in the form of a disk, which is press-fitted in an opening formed in an end of the body 10 such that the stopper 211 closes the opening.

The stopper 211 has an insertion hole 211a formed to axially extend through the center thereof, and further a plurality of communication holes 211b formed to extend through the stopper 211 in parallel with the insertion hole 211a. Refrigerant can flow through the communication holes 211b.

Further, the urging member 220 is provided with a flanged portion 221 which radially outwardly extends from an axially central portion thereof, and an end of the urging member 220 opposite from the shaft-like member 230 is inserted into the insertion hole 211a of the stopper 211. Between the stopper 211 and the urging member 220 is interposed a compression coil spring 212 for urging the urging member 220 toward the shaft-like member 230. With this configuration, although the shaft-like member 230 has both ends thereof brought into abutment with the urging member 220 and the core 242, respectively, for being axially restricted in motion, the shaft-like member 230 can be displaced by a predetermined amount in a direction perpendicular to the axial direction, since there is formed a clearance between the same and the insertion hole 55 of the plunger 41.

Further, in the present embodiment as well, the sizes and the shapes of the respective valve portions and the valve seats associated therewith are set and configured such that the flow passage cross-section formed by the gap between the valve portion 22 and the valve seat 12, and the flow passage cross-section formed by the gap between the valve portion 23 and the valve seat 31 have approximately the same size when the expansion valve is open.

Also in the expansion valve 201 described above, the valve portions 22 and 23 are configured to move to and away from the respective valve seats 12 and 31 approximately simultaneously. Therefore, it is possible to obtain the same advantageous effects as provided by the first embodiment. Further, the expansion valve 201 as well is capable of functioning as a bidirectional expansion valve.

Further, since the shaft-like member 230 can be displaced by a predetermined amount in the direction perpendicular to the axial direction, e.g. even if there are small machining errors or assembling errors in either of the valve element 20 and the plunger 41, causing displacement of the respective axes of the two valve portions 22 and 23 from each other, the shaft-like member 230 operates such that the valve portion 23 is seated on the valve seat 31. As a result, the two valve portions 22 and 23 can be moved to and away from the respective valve seats 12 and 31 associated therewith, simultaneously.

[Third Embodiment]

Figure 5:
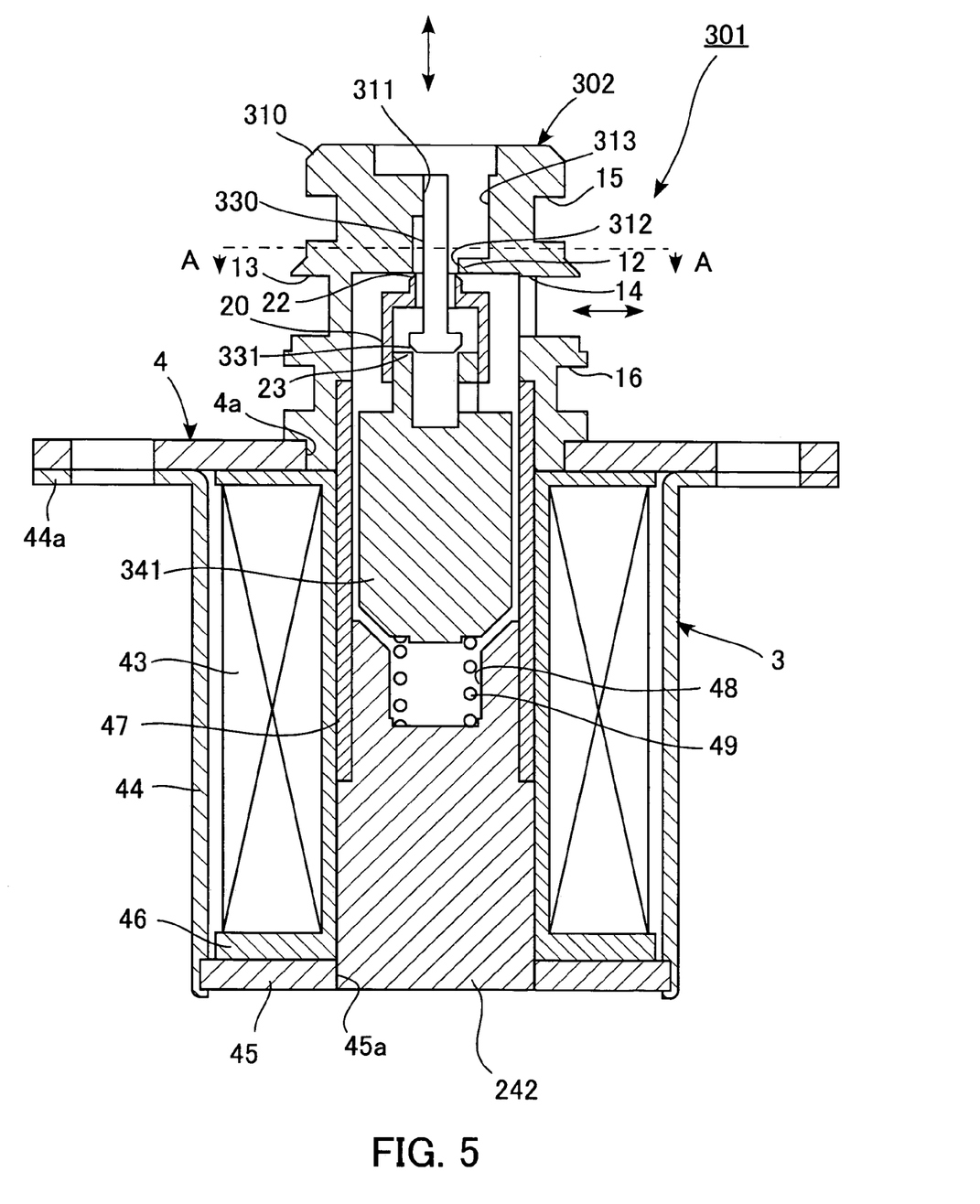
FIG. 5 is a cross-sectional view showing the configuration of an expansion valve according to a third embodiment of the present invention.
Figure 6:
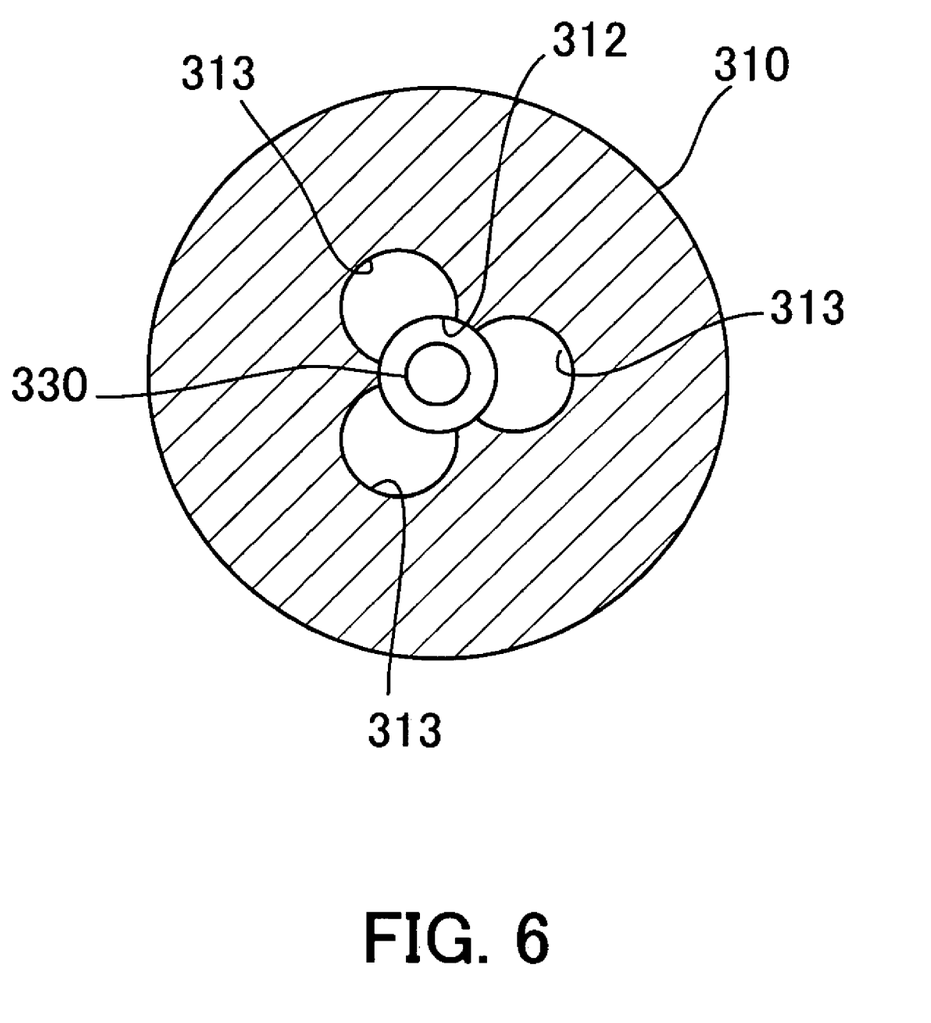
FIG. 6 is a cross-sectional view of the expansion valve taken on line A—A of FIG. 5.

Next, a description will be given of a third embodiment of the present invention. FIG. 5 is a cross-sectional view showing the configuration of an expansion valve according to the present embodiment, and FIG. 6 is a cross-sectional view of the expansion valve taken on line A—A of FIG. 5. It should be noted that component parts approximately identical to those of the first embodiment or the second embodiment will be designated by identical reference numerals as required, and description thereof is omitted.

As shown in FIG. 5, in the expansion valve 301, a plunger 341 is not formed with the insertion hole 55 extending in the axial direction shown in FIG. 2, but is formed to be solid.

Further, a shaft-like member 330 has a lower end which radially outwardly extends to form a flanged portion having a tapered shape the outer diameter of which is reduced toward the foremost end thereof. The tapered portion forms a valve seat 331 on which the valve portion 23 is seated. The shaft-like member 330 extends through the valve portion 22, and a valve hole 312 defining the valve seat 12 on which the valve portion 22 is seated. The other end of the shaft-like member 330, opposite from the valve seat 331, is rigidly fitted in a fitting hole 311 axially extending through a body 310 of the valve main body 302 by press-fitting.

Further, as shown in FIG. 6, the body 310 is formed with three communication holes 313 which extend through the body 310 around the shaft-like member 330 in parallel with the axis thereof, for communication with the valve hole 312. Refrigerant can flow through the communication holes 313 and the valve hole 312.

It should be noted that in the present embodiment as well, the sizes and the shapes of the respective valve portions and the valve seats associated therewith are set and configured such that the flow passage cross-section formed by the gap between the valve portion 22 and the valve seat 12, and a flow passage cross-section formed by a gap between the valve portion 23 and the valve seat 331 have approximately the same size when the expansion valve is open.

Also in the expansion valve 301 described above, the valve portions 22 and 23 are configured to move to and away from the respective valve seats 12 and 31 approximately simultaneously. Therefore, it is possible to obtain the same advantageous effects as provided by the first embodiment. Further, the expansion valve 301 as well is capable of functioning as a bidirectional expansion valve.

[Fourth Embodiment]

Figure 7:
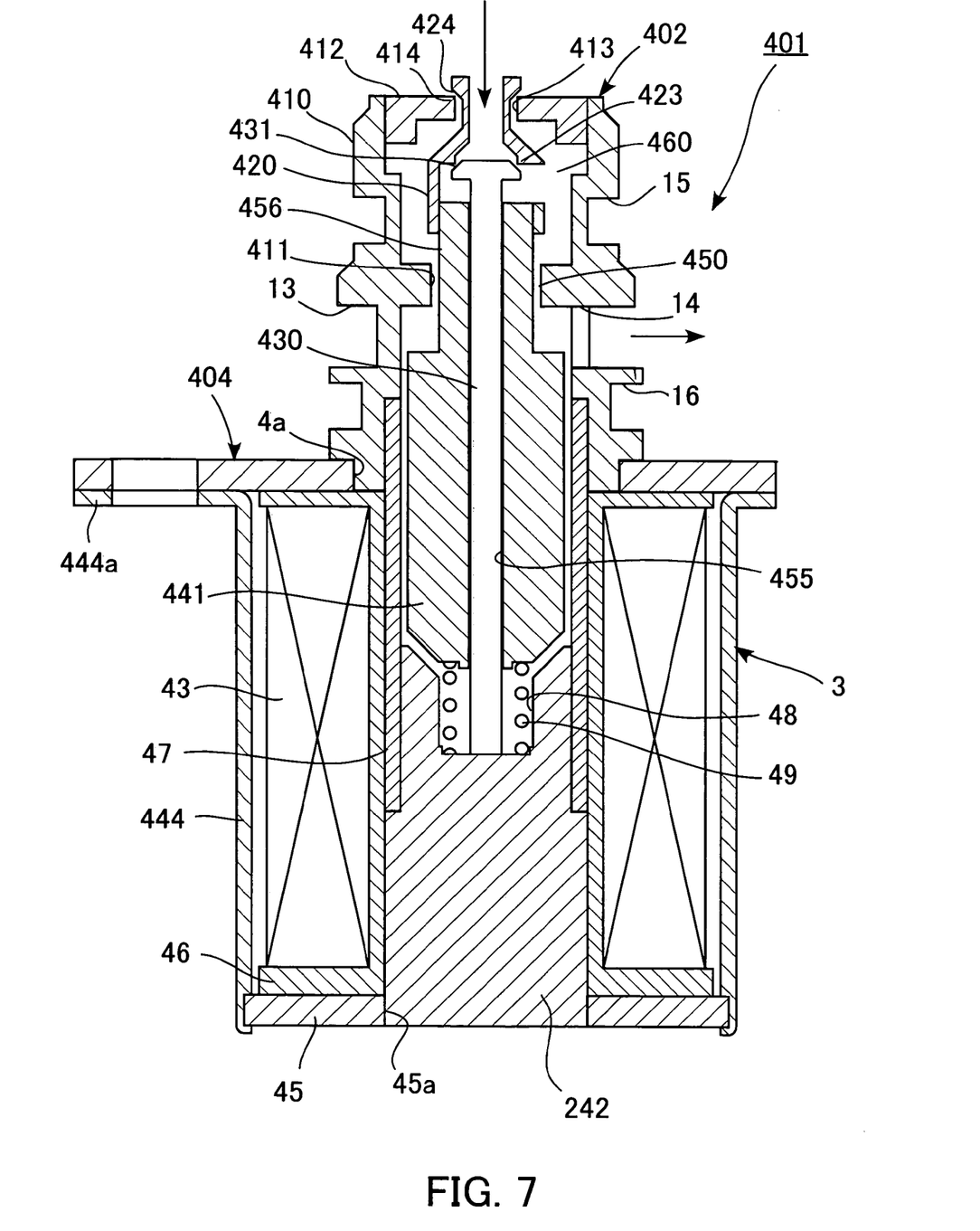
FIG. 7 is a cross-sectional view showing the configuration of an expansion valve according to a fourth embodiment of the present invention.
Figure 8:
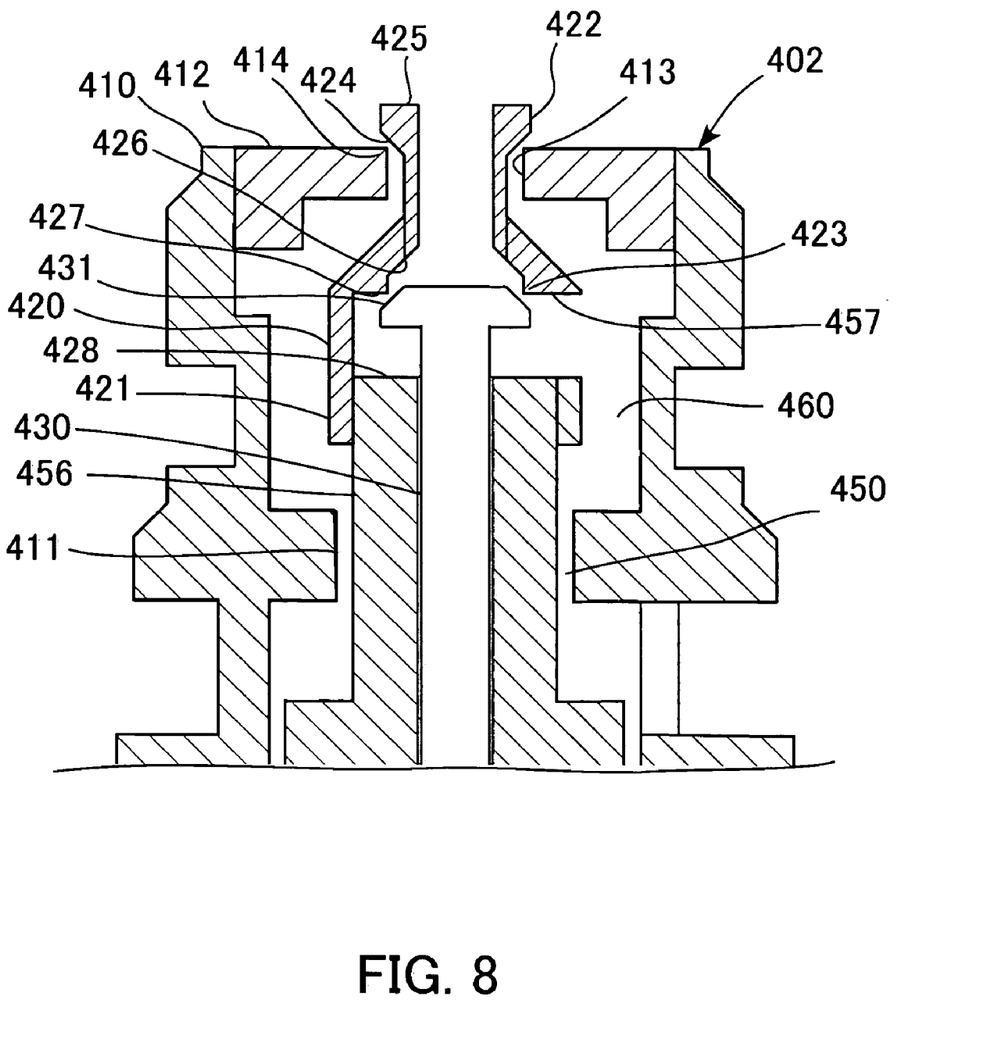
FIG. 8 is an enlarged view showing the configuration of a valve main body of the expansion valve.

Next, a description will be given of a fourth embodiment of the present invention. FIG. 7 is a cross-sectional view showing the configuration of an expansion valve according to the present embodiment, and FIG. 8 is an enlarged view showing the configuration of a valve main body of the expansion valve. It should be noted that component parts approximately identical to those of the first embodiment or the second embodiment will be designated by identical reference numerals as required, and description thereof is omitted.

Referring to FIG. 7, in the expansion valve 401, a restriction passage 450 having a narrowed and fixed flow passage cross-section is formed within a body 410 of a valve main body 402. More specifically, a flanged portion 411 radially inwardly extending is formed at a location closer to the center of the body 410 in the axial direction, and the restriction passage 450 is formed by a gap between a circular hole defined by the flanged portion 411 and a valve element-forming portion 456 of the plunger 441, extending through the circular hole.

Further, a long shaft-like member 430 is inserted through an insertion hole 455 axially extending through a plunger 441 with a predetermined clearance, and a valve element 420 is fixed to the valve element-forming portion 456 by press-fitting such that the valve element 420 covers a valve seat 431 formed at a foremost end thereof. Further, a stopper 412 in the form of a disk is press-fitted in an opening formed in an end of the body 410 such that the stopper 412 closes the opening. The foremost end of the valve element 420 is inserted into a valve hole 413 formed in a manner axially extending through the center of the stopper 412.

When FIG. 7 is compared with FIG. 2, on the right side of FIG. 7, there are not found insertion holes formed through a flanged portion 444a of a yoke 444 and a plate 404 for insertion of the screw 63. This is only because the insertion holes in FIG. 7 are formed at different locations than in FIG. 2, due to the positional relationship between the insertion holes and the refrigerant passage 71. In short, the insertion holes are formed at different circumferential locations about the axis of the core.

Referring to FIG. 8, the valve element 420 is formed by fitting a hollow cylindrical second member 422 in the foremost end of a hollow cylindrical first member 421 to be press-fitted on the valve element-forming portion 456. The first member 421 includes a hollow cylindrical body having an inner diameter approximately equal to the outer diameter of the valve element-forming portion 456, and an end of the body, opposite from the valve element-forming portion 456, has a tapered shape the outer diameter of which is reduced toward the foremost end thereof. The tapered portion has a valve portion 423 formed at an inner periphery of a root portion thereof in a manner protruding radially inward. Further, an end of the second member 422, opposite from the first member 421, extends through the valve hole 413 of the stopper 412 such that a refrigerant passage is formed by a gap between the second member 422 and the stopper 412. The foremost end of the second member 422 is formed with a tapered portion the outer diameter of which is expanded toward the foremost end thereof, and the tapered portion forms a valve portion 424. In the expansion valve 401, a side wall of the first member 421 is formed with a communication hole 457 for communication between the inside and the outside of the expansion valve 401 to allow refrigerant to flow downstream. In the above-described shaft-like member 430, the valve seat 431 is set to a location in such a relation to the valve element 420 as enables the two valve portions 424 and 423 to be seated on the respective valve seats 414 and 431, simultaneously. Further, the effective pressure-receiving area of the valve portion 424 seated on the valve seat 414 (i.e. the flow passage cross-sectional area of the valve hole 413), and the effective pressure-receiving area of the valve portion 423 seated on the valve seat 431 (i.e. the flow passage cross-sectional area surrounded by the opening rim of the valve portion 423) are configured to be equal to each other.

Further, the valve element 420 as well is formed with a pressure-canceling structure. More specifically, a valve-closing pressure-receiving surface for receiving the pressure of high-pressure refrigerant introduced into the valve element 420 from the upstream side is formed by an end face 425 of the second member 422, while a valve-opening pressure-receiving surface for receiving the pressure of the high-pressure refrigerant is formed by a tapered surface 426 formed inside the junction of the first member 421 and the second member 422. Further, a valve-opening pressure-receiving surface for receiving the pressure of refrigerant decompressed by passing through the valve portion 423 is formed by a downstream facing surface 427 in the vicinity of the valve portion 423 of the first member 421, while a valve-closing pressure-receiving surface for receiving the pressure of the decompressed refrigerant is formed by an end face 428 of the valve element-forming portion 456. This makes it possible to cancel part of the pressure of the refrigerant applied to the valve element 420.

The stopper 412 is formed with the valve seat 414 which is formed by an opening rim of an open end defining the valve hole 413 such that the valve portion 423 can be removably seated on the valve seat 414. Further, a lower end-side inner periphery of the stopper 412 is expanded in diameter such that a refrigerant passage can be formed between the stopper 412 and the tapered portion of the first member 421.

It should be noted that in the present embodiment as well, the sizes and the shapes of the respective valve portions and the valve seats associated therewith are set and configured such that a flow passage cross-section formed by a gap between the valve portion 424 and the valve seat 414, and a flow passage cross-section formed by a gap between the valve portion 423 and the valve seat 431 have approximately the same size when the expansion valve is open.

Next, the operation of the expansion valve 401 will be described with reference to FIG. 8.

First, when the electric current is not supplied to the solenoid coil 43, the plunger 441 is urged in the upstream direction by the compression coil spring 49, so that the valve portions 424 and 423 are away from the valve seats 414 and 431, respectively, and the expansion valve 401 is open.

When the electric current i is supplied to the solenoid coil 43, an electromagnetic force with a magnitude dependent on the value of the electric current is generated to attract the plunger 441 to the core 242, whereby there is generated a force in a direction in which the valve element 420 is seated against the urging force of the compression coil spring 49. As a result, the valve element 420 stands still at a location where the electromagnetic force and the load of the compression coil spring 49 are balanced, thereby forming predetermined flow passage cross-sections between the respective valve portions and the valve seats associated therewith.

In this state, when high-pressure refrigerant is introduced from the upstream side, the refrigerant passes through the gap between the valve portion 424 and the valve seat 414, and the gap between the valve portion 423 and the valve seat 431 to be decompressed by the passage, and flows downstream. Further, the refrigerant undergoes adiabatic expansion by passing through the restriction passage 450, to be delivered downstream of the refrigerant passage 71 through the communication hole 14. At this time, part of the pressure of the refrigerant applied to the valve element 420 and further to the plunger 441 is canceled by the above-mentioned pressure-canceling structure.

Now, assuming that the inlet pressure of the refrigerant before passing through the gaps between the respective valve portions and valve seats after being introduced from the upstream side is represented by P1, the pressure of the refrigerant in an intermediate region 460 where the refrigerant is decompressed by passing through the gaps between the respective valve portions and valve seats, by P2, the outlet pressure of the refrigerant further decompressed by passing through the restriction passage 450 by P3, the effective pressure-receiving area of the valve portion 424 seated on the valve seat 414 (i.e. the flow passage cross-sectional area of the valve hole 413) by A, the effective pressure-receiving area of the valve portion 423 seated on the valve seat 431 (i.e. the flow passage cross-sectional area surrounded by the opening rim of the valve portion 423) by B, and the flow passage cross-sectional area of the restriction passage 450 by C, the flow rate Gf of the refrigerant flowing through the expansion valve 401 is expressed by the following equation:

$$Gf=KC(P2-P3) \qquad (6)$$

In this equation, K designates a flow rate coefficient.

On the other hand, as for forces acting on the valve element 420 and further the plunger 441, assuming that an electromagnetic force generated by the electric current i is represented by f(i), load applied by the compression coil spring 49 in the upstream direction by fs, and the flow passage cross-sectional areas formed by the gaps between the respective valve portions and the valve seats associated therewith, when the electric current i is supplied, by s(i), the cross-sectional area of the valve element-forming portion 456 by D, the relationship between forces in the upward direction and forces in the downward direction is expressed by the following equations:

$$((A-s(i))-(B-s(i)))\times(P1-P2)+D(P2-P3)=fs-f(i) \qquad (7)$$

When the fact that A=B holds in the present embodiment is taken into account, from the equations (6) and (7), the flow rate Gf is calculated by the following equation:

$$Gf=(KC/D)\times(fs-f(i)) \qquad (8)$$

That is, the influence of the flow passage cross-sectional area s(i) which varies with the electric current i is eliminated. Further, on the right side of the equation (8), the parameters other than the electromagnetic force f(i) are substantially fixed values, and the differential pressure across the restriction passage 450 is held constant, based on the same principle as described above in the first embodiment, and hence the flow rate Gf is obtained as a constant flow rate proportional to the electric current i supplied to the solenoid coil 43. In short, the expansion valve 401 is configured as a flow regulating valve.

Also in the expansion valve 401 described above, the valve portions 424 and 423 are configured to move to and away from the respective valve seats 414 and 431 simultaneously. Therefore, it is possible to obtain the same advantageous effects as provided by the first embodiment.

[Fifth Embodiment]

Figure 9:
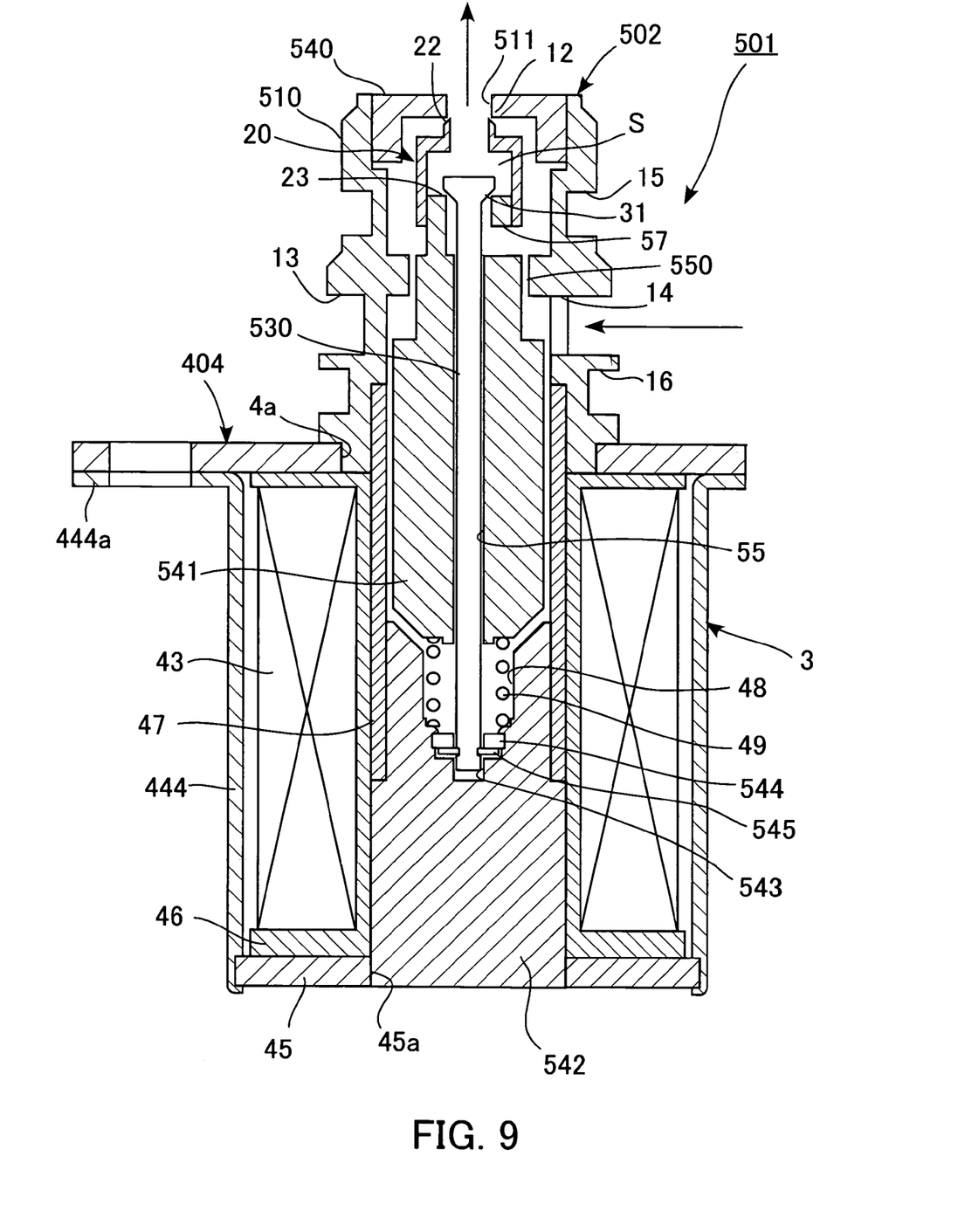
FIG. 9 is a cross-sectional view showing the configuration of an expansion valve according to a fifth embodiment of the present invention.

Next, a description will be given of a fifth embodiment of the present invention. FIG. 9 is a cross-sectional view showing the configuration of an expansion valve according to the present embodiment. It should be noted that component parts approximately identical to those of the first to fourth embodiments will be designated by identical reference numerals as required, and description thereof is omitted.

Referring to FIG. 9, in the expansion valve 501, refrigerant flows in a direction opposite to the direction in which refrigerant flows in the fourth embodiment described above, and a restriction passage 550 is disposed on the upstream side of the valve element 20. Further, a stopper 540 in the form of a disk is press-fitted in an opening formed in an end of a body 510 of a valve main body 502 such that the stopper 540 closes the opening. A valve hole 511 is formed in a manner axially extending through the center of the stopper 540. The valve seat 12 on which the valve portion 22 formed on the foremost end of the valve element 20 can be removably seated is formed by a peripheral edge of an opening of the valve hole 511 toward the valve element 20.

Further, the accommodating groove 48 of a core 542 has a bottom formed with a stepped groove 543 the diameter of which is stepwise reduced in a direction away from a plunger 541, and a stopper member 544 having an annular shape is fitted in an upper end of the stepped groove 543. On the other hand, a C ring 545 is fitted on a lower end of a shaft-like member 530 such that the upward movement of the shaft-like member 530 is restricted by the stopper member 544 at the location of the C ring 545. In the shaft-like member 530, the valve seat 31 is set to a location in such a relation to the valve element 20 as enables the two valve portions 22 and 23 to be seated on the respective valve seats 12 and 31 simultaneously.

When the valve element 20 is open, refrigerant flowing in from the upstream side of the refrigerant passage 71 undergoes adiabatic expansion by passing through the restriction passage 550, and then further decompressed by passing through the gap between the valve portion 23 and the valve seat 31 and the gap between the valve portion 22 and the valve seat 12, to be delivered downstream.

It should be noted that in the present embodiment as well, the sizes and the shapes of the respective valve portions and the valve seats associated therewith are set and configured such that the flow passage cross-section formed by the gap between the valve portion 22 and the valve seat 12, and the flow passage cross-section formed by the gap between the valve portion 23 and the valve seat 31 have approximately the same size when the expansion valve is open.

Also in the expansion valve 501 described above, the valve portions 22 and 23 are configured to move to and away from the respective valve seats 12 and 31 approximately simultaneously. Therefore, it is possible to obtain the same advantageous effects as provided by the first embodiment.

[Sixth Embodiment]

Figure 10:
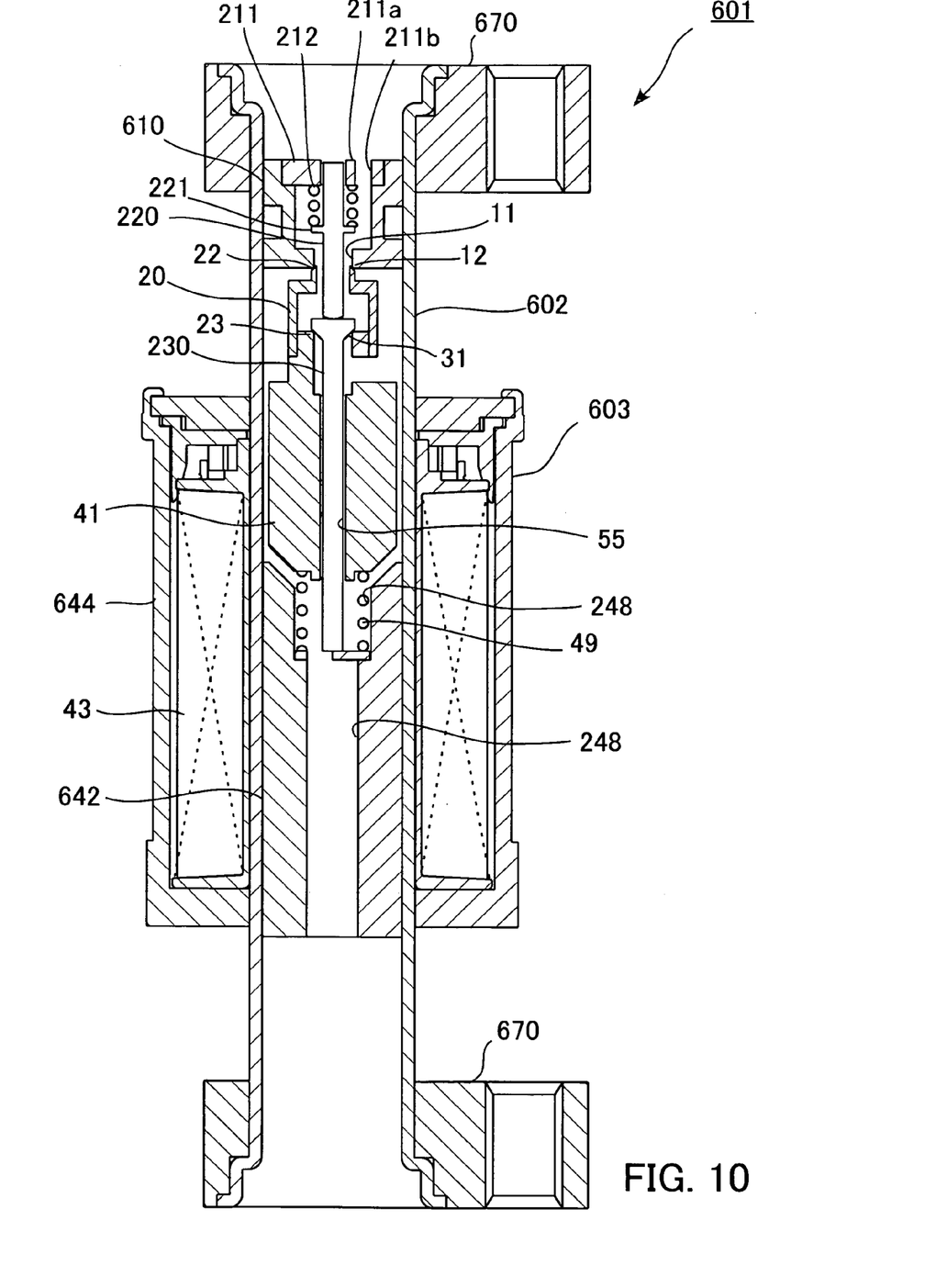
FIG. 10 is a cross-sectional view showing the configuration of an expansion valve according to a sixth embodiment of the present invention.

Next, a description will be given of a sixth embodiment of the present invention. FIG. 10 is a cross-sectional view showing the configuration of an expansion valve according to the present embodiment. It should be noted that the expansion valve according to the present embodiment is configured as a pipe-integrated expansion valve to be connected to an intermediate portion of piping of a refrigeration cycle, and components, such as a valve element and the like, employed therein are approximately the same as those of the expansion valve in the second embodiment described above. Therefore, component parts similar to those of the second embodiment will be designated by identical reference numerals, and description thereof is omitted.

The expansion valve 601 has a body 602 constructed by a hollow cylindrical pipe with opposite ends thereof open. The body 602 contains a plunger 41 to which the valve element 20 is fixed, a core 642, a shaft-like member 230, the urging member 220, and a stopper 610. The solenoid coil 43, a hollow cylindrical yoke 644, and so forth, which form a solenoid 603, are circumferentially arranged in a manner surrounding the body 602 from outside. Further, in the shaft-like member 230, the valve seat 31 is set to a location in such a relation to the valve element 20 as enables the two valve portions 22 and 23 to be seated on the respective valve seats 12 and 31 simultaneously.

It should be noted that in the present embodiment as well, the sizes and the shapes of the respective valve portions and the valve seats associated therewith are set and configured such that the flow passage cross-section formed by the gap between the valve portion 22 and the valve seat 12, and the flow passage cross-section formed by the gap between the valve portion 23 and the valve seat 31 have approximately the same size when the expansion valve is open.

Also in the expansion valve 601 described above, the valve portions 22 and 23 are configured to move to and away from the respective valve seats 12 and 31 approximately simultaneously. Therefore, it is possible to obtain the same advantageous effects as provided by the first embodiment.

Although the preferred embodiments of the present invention have been described heretofore, the present invention is by no means limited to any specific one of the above-described embodiments, but it is to be understood that various modifications and alterations can be made thereto without departing the spirit and scope of the present invention.

For example, although in the first to fifth embodiments, the body of each expansion valve is directly fixed to the piping body 70, by way of example, this is not limitative, but the expansion valve may be provided with a casing or the like for accommodating the body, and the casing or the like may be connected to the piping.

Further, although in each of the above embodiments, the valve portion and the valve element are each formed by two stages, by way of example, this is not limitative, but the valve portion and the valve element may be formed by two or more stages, so long as at least part of the influence of fluid pressure on the valve portions, caused by changes in the effective pressure-receiving area in the lifted state of each valve portion, can be canceled.

Further, although in the second embodiment, the shaft-like member 230 and the urging member 220 are configured as separate members, and brought into abutment with each other in the space S, the shaft-like member 230 and the urging member 220 may be integrally formed with each other. Even in this case, if a predetermined clearance is provided in advance between the insertion hole 211a of the stopper 211 and the urging member 220, the shaft-like member 230 operates such that the valve portion 23 is seated on the valve seat 31. As a result, it is possible to cause the two valve portions 22 and 23 to move to and away from the respective valve seats 12 and 31 associated therewith simultaneously.

Further, although in each of the above embodiments, the fluid control valve according to the present invention is configured as an expansion valve disposed in a refrigeration cycle for an automotive air conditioner, by way of example, this is not limitative, but the present invention can be applied to any control valves similarly so long as they are control valves for variable displacement compressors or other control valves for controlling the flow rate of refrigerant.

Further, the present invention can be applied not only to the refrigeration cycle for an automotive air conditioner but also to any control valves so long as they are fluid control valves for adjusting the flow rate of fluid introduced from the upstream side to allow the fluid to be delivered downstream, such control valves e.g. for a hot water supply system.

Furthermore, although in each of the above embodiments, the description has been given of the configuration in which the valve element is electromagnetically actuated by the solenoid, this is not limitative, but the present invention can also be applied to a so-called mechanical type fluid control valve in which the valve element is actuated by an internal mechanical constitution including a spring, and the pressure of fluid.

Further, although in each of the above embodiments, the first valve portion and the second valve portion are seated on the first valve seat and the second valve seat, respectively, in a manner engaged therewith, but it can be allowed that the first valve portion and the second valve portion are slidably inserted into valve holes formed by the first valve seat and the second valve seat, thereby closing the valve holes.

According to the fluid control valve of the present invention, the first valve portion and the second valve portion are configured such that they can move to and away from the first valve seat and second valve seat, respectively, approximately simultaneously, thereby preventing or suppressing the influence of changes in the effective pressure-receiving areas on the pressure balance in the lifted states of the respective valve portions. As a result, it is possible to prevent or suppress degradation of the accuracy of flow rate control dependent on the lift amount of the valve element.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A fluid control valve that adjusts a flow rate of fluid introduced from an upstream side thereof to allow the fluid to be delivered downstream, comprising:
   a body having a flow passage of the fluid formed therein;
   a first valve seat and a second valve seat arranged in the body along the flow passage;
   a valve element having a first valve portion and a second valve portion which are formed integrally therewith, the first valve portion and the second valve portion being capable of moving to and away from the respective first valve seat and second valve seat, approximately simultaneously, the valve element moving forward and backward within the body while being supported therein, to thereby adjust a flow rate of the fluid allowed to be delivered downstream according to a lift amount of each valve portion from the valve seat associated therewith; and
   a pressure-canceling structure including a valve-opening pressure-receiving surface for receiving a pressure of the fluid acting on the valve element in a valve-opening direction, and a valve-closing pressure-receiving surface for receiving a pressure of the fluid acting on the valve element in a valve-closing direction, the pressure-canceling structure canceling at least part of the pressure of the fluid acting on the valve element.

2. The fluid control valve according to claim 1, comprising a solenoid including a core fixed to the body, a plunger for fixing the valve element thereto for moving forward and backward in unison with the valve element within the body, and a solenoid coil for generating a magnetic circuit including the plunger and the core by electric current externally supplied thereto, and
   wherein the fluid control valve is configured as a solenoid valve that controls the lift amount of the valve element according to a value of electric current supplied to the solenoid coil, and adjusts the flow rate of fluid introduced from the upstream side thereof, thereby allowing the fluid to be delivered downstream.

3. The fluid control valve according to claim 2, wherein a flow passage cross-section formed by a gap between the first valve portion and the first valve seat, and a flow passage cross-section formed by a gap between the second valve portion and the second valve seat are configured to have approximately the same size when the fluid control valve is open.

4. The fluid control valve according to claim 3, wherein the valve element includes a body having an introduction passage for introducing the fluid, a delivery passage for delivering the fluid, and an expanded pipe portion provided between the introduction passage and the delivery passage, and
   wherein one of the first valve portion and the second valve portion is formed by an end of the body toward the introduction passage or the delivery passage, while the other of the first valve portion and the second valve portion is formed by a stepped portion of the expanded pipe portion toward the introduction passage or the delivery passage, and
   wherein one of the first valve seat and the second valve seat is formed by a stepped portion formed within the body, while the other of the first valve seat and the second valve seat is formed by a portion of a shaft-like member partially inserted into the expanded pipe portion.

5. The fluid control valve according to claim 4, wherein the shaft-like member is inserted into a though hole formed along an axis of the plunger with a predetermined clearance, an end of the shaft-like member opposite from the second valve seat being axially supported by the core.

6. The fluid control valve according to claim 5, comprising:
   an urging member supported within the body and capable of being brought into abutment with the shaft-like member from a side opposite from the core; and
   urging means for urging the urging member toward the core, and
   wherein the shaft-like member is configured to have axially opposite ends thereof brought into abutment with the urging member and the core, respectively, for being restricted in an axial direction thereof, and be capable of moving in a direction perpendicular to the axial direction by a predetermined amount.

7. The fluid control valve according to claim 3, wherein an effective pressure-receiving area of the first valve portion and an effective pressure-receiving area of the second valve portion are configured to be equal to each other when the fluid control valve is closed, whereby the fluid control valve functions as a proportional control valve in which a valve opening degree thereof becomes equal to a value proportional to a value of electric current supplied to the solenoid coil.

8. The fluid control valve according to claim 3, wherein an effective pressure-receiving area of the first valve portion and an effective pressure-receiving area of the second valve portion are configured to be different from each other when the fluid control valve is closed, whereby the fluid control valve functions as a differential pressure valve in which differential pressure across the fluid control valve becomes equal to a fixed value dependent on a value of electric current supplied to the solenoid coil.

9. The fluid control valve according to claim 3, wherein a restriction passage having a constant flow passage cross-section is provided on an upstream side or a downstream side of the valve element, whereby the fluid control valve functions as a constant flow rate valve in which a flow rate of fluid allowed to be delivered downstream becomes equal to a fixed value dependent on a value of electric current supplied to the solenoid coil.

10. The fluid control valve according to claim 3, wherein the fluid control valve functions as a bidirectional control valve capable of allowing the fluid to flow bidirectionally with respect to the valve element.

* * * * *